(12) United States Patent
Esaki et al.

(10) Patent No.: US 9,398,672 B2
(45) Date of Patent: Jul. 19, 2016

(54) LIGHTING DEVICE AND ILLUMINATION APPARATUS

(71) Applicant: Panasonic Corporation, Osaka (JP)

(72) Inventors: Sana Esaki, Osaka (JP); Masahiro Naruo, Osaka (JP); Shigeru Ido, Osaka (JP); Kenichi Fukuda, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 609 days.

(21) Appl. No.: 13/677,533

(22) Filed: Nov. 15, 2012

(65) Prior Publication Data

US 2013/0127367 A1 May 23, 2013

(30) Foreign Application Priority Data

Nov. 18, 2011 (JP) ................................. 2011-252944

(51) Int. Cl.
*H05B 41/36* (2006.01)
*H05B 37/03* (2006.01)
*H05B 33/08* (2006.01)

(52) U.S. Cl.
CPC .............. *H05B 37/03* (2013.01); *H05B 33/089* (2013.01); *H05B 33/0815* (2013.01); *Y02B 20/346* (2013.01)

(58) Field of Classification Search
CPC ........... H05B 33/0827; H05B 33/0815; H05B 33/0809; H05B 37/02; G09G 3/3406; G09G 2320/064
See application file for complete search history.

(56) References Cited

U.S. PATENT DOCUMENTS

| | | | |
|---|---|---|---|
| 2003/0226954 A1 | 12/2003 | Ohmi | |
| 2004/0080273 A1 | 4/2004 | Ito et al. | |
| 2004/0212318 A1* | 10/2004 | Hamamoto et al. | 315/200 R |
| 2006/0087843 A1* | 4/2006 | Setomoto et al. | 362/249 |
| 2006/0170287 A1 | 8/2006 | Ito et al. | |
| 2007/0152604 A1* | 7/2007 | Tatsumi | H05B 33/0815 315/247 |

(Continued)

FOREIGN PATENT DOCUMENTS

| | | |
|---|---|---|
| CN | 101355841 A | 1/2009 |
| JP | S62-15925 | 1/1987 |

(Continued)

OTHER PUBLICATIONS

LC554OLD_APPLICATION Note Rev.1.2 (Sanken Electric Co., Ltd.).

(Continued)

*Primary Examiner* — Douglas W Owens
*Assistant Examiner* — Monica C King
(74) *Attorney, Agent, or Firm* — Renner, Otto, Boisselle & Sklar, LLP (57) ABSTRACT

A lighting device includes: a DC converter including at least an inductor, a switching unit and a diode and being configured to output an energy accumulated in the inductor to a load via the diode by using an input from a DC power source when the switching unit is turned off; a load voltage detection unit connected to the load to detect a load voltage of the load; and an abnormality determining unit configured to determine an abnormality when the load voltage is equal to or less than a preset threshold voltage. The device further includes an output control unit configured to drive the switching unit so that oscillation of the switching unit is stopped or the output of the DC converter is decreased when the abnormality is determined.

13 Claims, 8 Drawing Sheets

(56) References Cited

U.S. PATENT DOCUMENTS

| | | |
|---|---|---|
| 2007/0236155 A1 | 10/2007 | Kao et al. |
| 2008/0074058 A1 | 3/2008 | Lee et al. |
| 2008/0238344 A1 | 10/2008 | Isobe et al. |
| 2009/0026977 A1 | 1/2009 | Omi |
| 2011/0037407 A1 | 2/2011 | Ahn et al. |
| 2011/0248647 A1 | 10/2011 | Hiramatu et al. |
| 2011/0260617 A1* | 10/2011 | Tanaka ............ 315/82 |
| 2012/0146550 A1 | 6/2012 | Takahashi et al. |

FOREIGN PATENT DOCUMENTS

| | | |
|---|---|---|
| JP | 2004-9826 | 1/2004 |
| JP | 2004-134147 | 4/2004 |
| JP | 2011-40673 | 2/2011 |
| JP | 2011-222266 | 11/2011 |
| TW | 200740095 | 10/2007 |

OTHER PUBLICATIONS

European Search Report for corresponding European Application No. 12 192 602.6 dated Mar. 22, 2013.
Chinese Office Action dated Jun. 18, 2014 and English translation thereof for corresponding Chinese Application No. 201210468399.7 dated Jun. 18, 2014.
The Japanese Office Action dated May 7, 2015 issued in corresponding Japanese Patent Application No. 2011-252944 and the English summary thereof.
European Office Action dated Sep. 10, 2015 issued in corresponding European Patent Application No. 12192602.6.

* cited by examiner

LIGHTING DEVICE AND ILLUMINATION APPARATUS

FIELD OF THE INVENTION

The present invention relates to a lighting device that lights a light emitting element and an illumination apparatus including the lighting device.

BACKGROUND OF THE INVENTION

Recently, as illumination apparatuses using a light emitting diode (LED) are widely used, high power and high value-added lighting products are increasingly introduced as the illumination apparatuses. Examples of such high power lighting product include a load circuit formed of an LED module having LEDs connected in series, a load circuit in which LED modules having LEDs are connected in parallel or the like. The high value-added products include load circuits formed by connecting in series or in parallel different types of LEDs, e.g., LEDs of different colors, LEDs having different Vfs (forward voltage drops), LEDs of different numbers, and LEDs having different dimming curves.

However, when the load circuit using the LEDs connected as described above partially or entirely gets into a no-load state or undergoes abnormal voltage increase due to a crack in a solder or failure in an LED element, the whole circuit may possibly be destroyed or characteristics thereof may be deteriorated.

To deal with such possible problems, techniques for detecting a no-load state or abnormal voltage increase and safely stopping the entire circuit has been examined (see, e.g., Application Note Rev. 1.0. for LC5540AD Series, Sanken electric Co., Ltd., pages 12 to 24 (Non-patent document 1) and Japanese Patent Application Publication No. 2004-134147 (JP2004-134147A)).

For example, Non-patent document 1 discloses an application note detailing an LED driver IC (Integrated Circuit). This application note describes a configuration of detecting the voltage of a zener diode ZD2 by using a photocoupler PC2 when an LED falls into a no-load state or undergoes abnormal voltage increase.

In Non-patent document 1, a flyback circuit of the LED driver IC is often used as a circuit for detecting the no-load state in a step-down converter. When a switching element is provided at a high side (high-voltage side) in the step-down converter, voltage at both ends of the LED may be easily detected based on resistance or the like. Meanwhile, when the switching element is provided at a low side (low-voltage side) to avoid rising costs of driving components, the photocoupler is required to detect the voltage at both ends of the LED.

In addition, JP2004-134147A discloses a lighting circuit for detecting an abnormality in the load of an LED to safely operate the LED. When an LED load circuit, in which circuits having LEDs connected in series are connected in parallel, is partially disconnected or broken, the lighting circuit performs the following operations to prevent an electric current from excessively flowing into a normal circuit.

That is, the lighting circuit detects the level of current, which is supplied to an LED series circuit having the LEDs connected in series, at a resistance connected in series to the LED serial circuit. Further, when an abnormality (I=0 in case of no-load state) is detected, the lighting circuit adjusts a driving signal to a switching regulator, thereby decreasing output voltage or stopping output. Accordingly, the lighting circuit of JP2004-134147A maintains a safe circuit operation and thus is commonly used for a conventional LED power supply.

Since, however, the LED driver IC of JP2004-134147A requires a large number of semiconductor components, such as a photocoupler, a zener diode and the like, it is hard to reduce the number of components for the simple detection of an abnormality in the load of the LED. For detection using a photocoupler, a circuit design in consideration of temperature characteristics is complicated.

Further, in JP2004-134147A, the Vf (forward voltage drop) of the LED is not detected but only an electric current supplied to the LED load circuit is detected. Thus, the lighting circuit of JP2004-134147A can simply detect an abnormality in the LED load, such as a no-load state, but cannot easily detect abnormal voltage increase. Moreover, in the LED load circuit formed by connecting LED series circuits in parallel, when abnormal voltages are different in the respective LED series circuits, threshold voltages for detecting an abnormality are different in the respective LED series circuits, resulting in complicated circuit design and configuration.

SUMMARY OF THE INVENTION

In view of the above, the present invention is to provide a lighting device and an illumination apparatus capable of detecting an abnormality in a load with a simple configuration.

In accordance with an aspect of the present invention, there is provided a lighting device including: a direct current (DC) converter including at least an inductor, a switching unit and a diode and being configured to output an energy accumulated in the inductor to a load via the diode by using an input from a DC power source when the switching unit is turned off; a load voltage detection unit connected to the load to detect a load voltage of the load; an abnormality determining unit configured to determine an abnormality when the load voltage is equal to or less than a preset threshold voltage; and an output control unit configured to drive the switching unit so that oscillation of the switching unit is stopped or the output of the DC converter is decreased when the abnormality is determined.

The DC converter may be a step-down converter, one terminal of the load is connected to a high-potential side of the DC power source, the inductor and the switching unit are connected in series between another terminal of the load and a low-potential side of the DC power source, an anode of the diode is connected between the inductor and the switching unit, and a cathode of the diode is connected to the high-potential side of the DC power source.

The DC converter may be a step-up/down converter, one terminal of the load is connected to a high-potential side of the DC power source, the diode and the switching unit are connected such that an anode of the diode directs toward the switching unit and a cathode of the diode directs toward another terminal of the load between the another terminal and a lower-potential side of the DC power source, and the inductor is connected between the high-potential side of the DC power source and a node connecting the diode and the switching unit.

The load voltage detection unit preferably has resistances connected in series between the another terminal of the load and a predetermined potential to divide voltage at a connection point with the another terminal.

The DC converter preferably has a discharge resistor connected in parallel with the load, the load is a module including light emitting elements connected in series, and a resistance of the discharge resistor is set such that the load voltage is less than a value obtained by multiplying 70% of rated forward voltage of the light emitting elements by a number of the light emitting elements.

The lighting device further includes a DC voltage detection unit detecting a DC voltage of the DC power source. The output control unit invalidates abnormality determination by the abnormality determining unit when the DC voltage detected by the DC voltage detection unit is out of a normal range.

The load may be configured with a module having light emitting element units connected in parallel, each of light emitting element units having light emitting elements connected in series, the light emitting element units are provided with DC converters and load voltage detection units, respectively, and the abnormality determining unit may determine an abnormality when at least one of load voltages detected by the load voltage detection units is equal to or less than a preset threshold voltage.

The output control unit may be provided with a timer, drives the switching unit to stop the oscillation of the switching unit or to decrease the output of the DC converter when the abnormality is determined, and then resumes the oscillation of the switching unit after a time set in the timer.

The load voltage detection unit may be connected to the load via another switching unit, and the output control unit preferably turns off the another switching unit when driving the switching unit to stop the oscillation of the switching unit or to decrease the output of the DC converter.

In accordance with another aspect of the present invention, there is provided an illumination apparatus including the lighting device and the load.

The present invention enables the detection of an abnormality in a load with a simple configuration.

BRIEF DESCRIPTION OF THE DRAWINGS

The objects and features of the present invention will become apparent from the following description of preferred embodiments given in conjunction with the accompanying drawings, in which.

DETAILED DESCRIPTION OF THE EMBODIMENTS

Hereinafter, a lighting device and an illumination apparatus in accordance with embodiments of the present invention will be described with reference to the accompanying drawings which form a part hereof. The lighting device in accordance with the embodiments is used in, e.g., illumination apparatus utilizing an LED as a load but may be employed for various types of illumination apparatus, without being limited thereto.

First Embodiment

Figure 1:
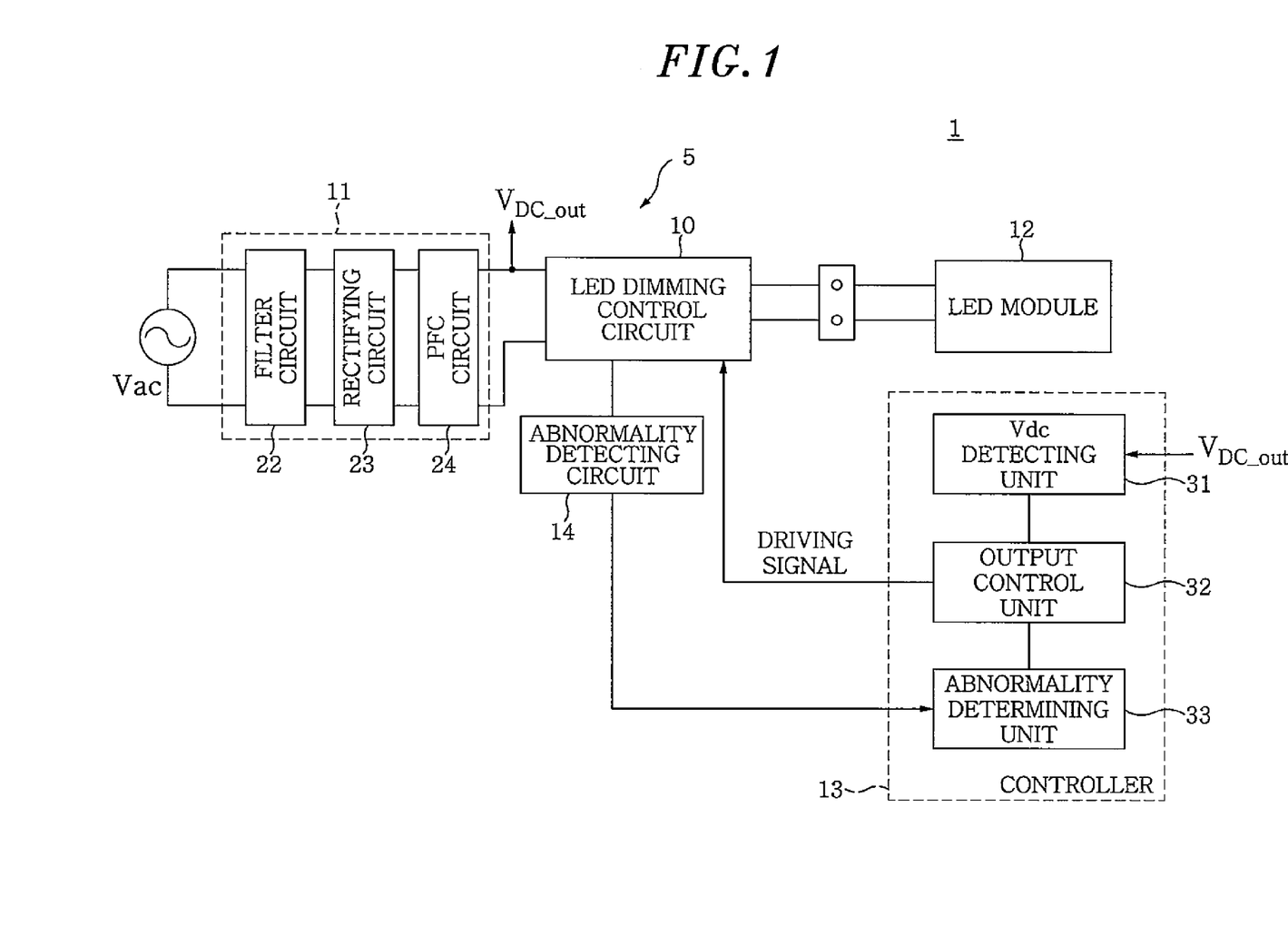
FIG. 1 is a block diagram illustrating a configuration of illumination apparatus in accordance with a first embodiment of the present invention.

FIG. 1 is a block diagram illustrating a configuration of illumination apparatus 1 in accordance with a first embodiment of the present invention. The illumination apparatus 1 includes an LED module 12 as a load and a lighting device 5. The lighting device 5 includes a DC power source 11 connected to a commercial power source Vac, an LED dimming control circuit 10, a controller 13 and an abnormality detecting unit 14.

The DC power source 11 rectifies and smoothes AC voltage from the commercial power source Vac to output DC voltage $V_{DC\_out}$ and includes a filter circuit 22, a rectifying circuit 23 and a PFC (Power Factor Correction) circuit 24.

The filter circuit 22 suppresses noises included in the AC voltage from the commercial power source Vac or an inrush current from the commercial power source Vac when the illumination apparatus 1 is turned on. The rectifying circuit 23 is formed with, e.g., a diode bridge and converts AC (Alternating Current) into a ripple current. The PFC circuit 24 suppresses decrease in power factor by controlling the amount of current flowing at a time. Here, the PFC circuit 24 may not be provided in the DC power source 11.

The LED dimming control circuit 10 includes a step-down converter as a DC converter therein to control a load voltage supplied to the LED module 12 based on a driving signal from the controller 13, thereby adjusting the light emitting amount of the LED module 12.

The LED module 12 as a light emitting unit (load) includes LEDs 121 and 122 (see FIG. 2), which are solid light emitting elements, connected in series.

The abnormality detecting unit 14 as a load voltage detection unit detects detection voltage Vc which corresponds to voltage Va (see FIG. 2) at a low-voltage side of the LED module 12 and is an indicator to show whether or not an abnormality occurs in the lighting circuit 5.

The controller 13 is configured with a microcomputer IC1 (see FIG. 2), and more specifically, includes a Vdc detecting unit 31, an output control unit 32, an abnormality determining unit 33, an AD conversion unit 34, and a timer 35.

The Vdc detecting unit 31 as a DC voltage detection unit detects the DC voltage $V_{DC\_out}$ outputted from the DC power source 11 and outputs the detected DC voltage $V_{DC\_out}$ to the output control unit 32.

The output control unit 32 outputs a driving signal to the LED dimming control circuit 10 and turns on and off (or oscillates) a switch element Q1 based on the driving signal. When an abnormality is determined by the abnormality determining unit 33, the output control unit 32 stops the driving signal to the LED dimming control circuit 10 or outputs a driving signal for decreasing the load voltage supplied to the LED module 12.

When the illumination apparatus 1 is turned on, the DC voltage $V_{DC\_out}$ detected by the Vdc detecting unit 31 may be out of a predetermined normal range. In this case, the output control unit 32 takes no action in response to abnormality detection in the illumination apparatus 1, i.e., determines that the result of abnormality determination by the abnormality determining unit 33 is invalid and does not stop the driving signal or does not output a driving signal for decreasing load voltage based on the abnormality determination. Accordingly, the lighting device 5 or the illumination apparatus 1 prevents faulty abnormality detection.

The abnormality determining unit 33 compares the detection voltage Vc detected by the abnormality detecting unit 14 with reference voltage (threshold value). When the detection voltage Vc is equal to or less than the reference voltage, the abnormality determining unit 33 determines that a no-load state occurs or an abnormality occurs in the load voltage supplied to the LED module 12.

Figure 2:
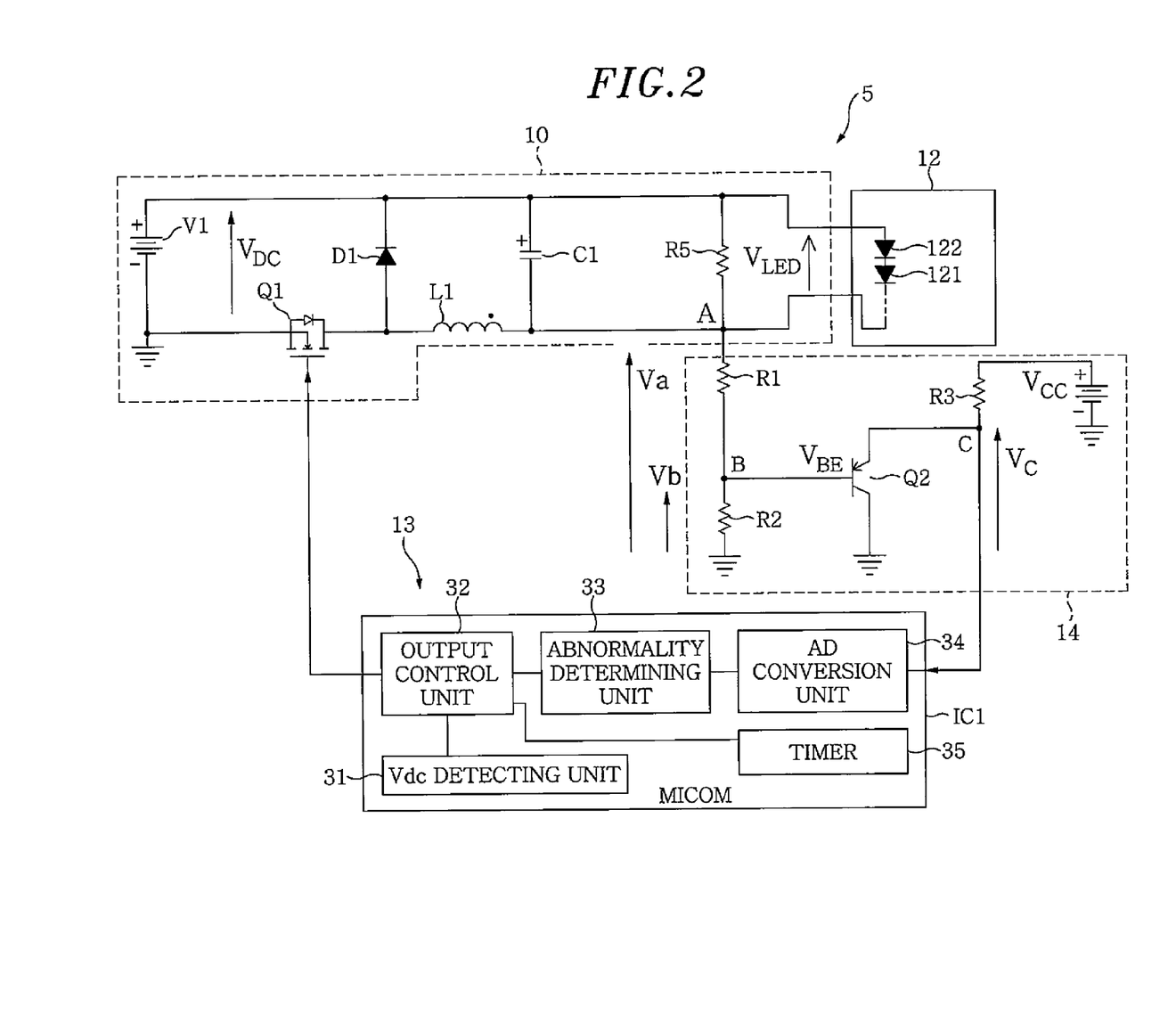
FIG. 2 is a circuit diagram illustrating a configuration of a lighting device in accordance with the first embodiment.

FIG. 2 is a circuit diagram illustrating a configuration of the lighting device 5 in detail. For conciseness in description, FIG. 2 does not illustrate the DC power source 11 of the lighting device 5. The DC voltage VDC from the DC power source 11 is applied as a DC power V1 to the LED dimming control circuit 10. The DC power V1 applied to the LED dimming control circuit 10 may be DC voltage applied to a secondary circuit of a flyback circuit connected to the PFC circuit 24 or be DC voltage outputted from the PFC circuit 24.

The LED dimming control circuit 10 is connected to the LED module 12 including the LEDs 121 and 122 connected in series. One terminal of the LED module 12 (the anode of the LED 122) is connected to a high potential side of the DC power source 11 and the other terminal thereof (the cathode of the LED 121) is connected to a connection point A to the abnormality detecting unit 14.

The LED dimming control circuit 10 includes a regenerative diode D1, a choke coil L1 for a chopper as an inductor, a switching element Q1 for controlling the step-down converter as a switching unit, a smoothing capacitor C1 and a discharge resistance R5. Further, the regenerative diode D1, the choke coil L1, the switching element Q1 for controlling the step-down converter, the smoothing capacitor C1 and the discharge resistance R5 form the step-down converter.

The switching element Q1 and the choke coil L1 are connected between a low-potential side of the DC power source 11 and the connection point A. Further, the anode of the regenerative diode D1 is connected between the switching element Q1 and the choke coil L1 and the cathode thereof is connected to the high-potential side of the DC power source 11.

The step-down converter oscillates the switching element Q1 on or off and regenerates (supplies or outputs) energy accumulated in the choke coil L1 to the load (LED module 12) via the regenerative diode D1 when the switching element Q1 is turned off. The smoothing capacitor C1 may be replaced by a film capacitor. In the present embodiment, as the switching element Q1, e.g., an FET (Field Effect Transistor) may be provided.

The abnormality detecting unit 14 is formed of resistances R1 and R2, a PNP transistor Q2 and a resistance R3.

The resistances R1 and R2 are connected in series to the discharge resistance R5 connected in parallel to the LED module 12 to divide the voltage Va at a low-voltage side of the discharge resistance R5 into voltage Vb. The voltage Va is represented by Equation 1. In Equation 1, $V_{LED}$ is load voltage.

$$V_a = V_{DC} - V_{LED} \quad \text{[Equation 1]}$$

The voltage Vb divided from the voltage Va is represented by Equation 2 and is inputted to a base of the PNP transistor Q2.

$$V_b = V_a \times \frac{R2}{R1 + R2} \quad \text{[Equation 2]}$$

Power supply voltage Vcc of the microcomputer IC1 is applied to an emitter of the PNP transistor Q2 via the resistance R3 and a collector of the PNP transistor Q2 is grounded.

When the voltage $V_{LED}$ is a predetermined value or higher due to a no-load state or abnormal voltage increase, the detection voltage Vc detected by an emitter-follower operation of the PNP transistor Q2 is changed. The detection voltage Vc is represented by Equation 3 and is preferably designed to be equal to or less than a threshold value of the microcomputer IC1.

$$V_c = V_b + V_{BE} \quad \text{[Equation 3]}$$

Herein, the detection voltage Vc satisfies 0V<Vc<5V. Further, in Equation 3, voltage $V_{BE}$ is voltage between the base and the emitter of the PNP transistor Q2.

When an abnormality occurs in the voltage of the LED module 12 as the load, the detection voltage Vc is measured by using the resistances R1, R2 and R3 and the PNP transistor Q2, thereby simply detecting an abnormality in the LED module 12.

The discharge resistance R5 has a value set as follows. In the lighting device 5 of the present embodiment, there is a path through which a current flows to the LED module 12 even when the output of a burst operation of the lighting device 5 is low or the LED dimming control circuit 10 is turned off (the lighting device 5 is turned off). That is, in FIG. 2, a path of the DC power source V1→the load (LED module 12)→the resistance R1→the resistance R2. Due to this, a phenomenon in which the LED module 12 slightly emits a light by the flow of current determined by the resistances R1 and R2 in the abnormality detecting unit 14 is detected.

Although such phenomenon is prevented by adjusting the values of the resistances R1 and R2 in the abnormality detecting unit 14 sufficiently high, it is difficult to increase the values of the resistances R1 and R2 excessively high by considering the influence of noise or the like.

In the present embodiment, the LED module 12 can be turned off by making voltage Vr5 developed between the two ends of the discharge resistance R5 to be less than the forward voltage Vfall of LED module 12.

The forward voltage Vfall is obtained by multiplying the forward voltage drop Vf by the number of LEDs connected in series.

The forward voltage drop Vf when the LEDs are completely turned off varies depending on the kind of the LEDs. Here, an experimental result confirms that the LED module 12 is completely turned off when voltage applied to the LEDs (LED voltage) is about 70% of rated forward voltage. However, the voltage applied to the LEDs is preferably about 50% of the rated forward voltage to further completely turn off the LED module 12. Accordingly, the phenomenon that the LED module emits a light does not occur when the lighting device 5 is turned off.

For example, when the rated forward voltage is 3.0 V, the forward voltage Vfall of the LED module 12 when turned off is 1.5 V×n (n: the number of LEDs in serial) by using 50% of 3.0 V, i.e., 1.5 V, and the voltage Vr5 at both ends of the discharge resistance R5 is calculated by Equation 4. In Equation 4, when n=4, the forward voltage Vfall is 6 V.

$$Vr5 = V_{DC} \times \frac{R5}{R1 + R2 + R5} < 1.5 \times n \quad \text{[Equation 4]}$$

The controller 13 is configured with the microcomputer IC1 including a CPU (Central Processing Unit) and a ROM (Read Only Memory). The microcomputer IC1 performs functions of the Vdc detecting unit 31, the output control unit 32, and the abnormality determining unit 33 by the CPU (not shown) running a control program stored in the ROM.

The AD conversion unit 34 in the controller 13 converts inputted detection voltage Vc of analog data into digital data. When the abnormality determining unit 33 determines that the detection voltage Vc of digital data converted by the AD conversion unit 34 is determined to be equal to or less than a threshold value (threshold voltage), outputting a driving signal (on/off signals) to the switching element Q1 is stopped to thereby stop the oscillation of the step-down converter.

When the abnormality determining unit 33 determines an abnormality, e.g., a state that the detection voltage Vc of digital data converted by the AD conversion unit 34 is equal to or less than the threshold value (threshold voltage), the output control unit 32 controls the driving signal (gate signal) of the switching element Q1 to be an off signal. Accordingly, the output control unit 32 stops the oscillation of the switching element Q1 and stops the operation of the step-down converter. Instead of stopping the operation of the step-down converter, the output control unit 32 may change each of on and off periods of the driving signal to decrease the output of the step-down converter.

Moreover, after stopping the oscillation of the switching element Q1, the output control unit 32 may resume oscillating the switching element Q1 after a set time (predetermined time) of the timer 35 embedded in the microcomputer IC1. Accordingly, when abnormal voltage increase occurs in the load temporarily, the output control unit 32 can restore the original operation in a shorter time. Further, the output control unit 32 may completely stop the operation of the step-down converter only when a process of resuming the oscillation of the switching element Q1→detecting an abnormality in the lighting device 5→stopping the oscillation of the switching element Q1 is repeated a plurality of times.

Further, the output control unit 32 may decrease the output of a primary side of the flyback circuit to prevent abnormal voltage increase in the load voltage $V_{LED}$. Further, when the output of the primary side is reduced, the PFC circuit 24 still operates, thus securing the power for the microcomputer IC1.

In the lighting device 5 with the foregoing configuration, when the LEDs 121 and 122 in the LED module 12 are deteriorated or get into a no-load state, the load voltage $V_{LED}$ at both ends of the discharge resistance R5 increases. Accordingly, when the voltage Va decreases and the voltage Vb decreases to a predetermined voltage, the PNP transistor Q2 is turned on. When the PNP transistor Q2 is turned on, the detection voltage Vc immediately decreases from the power supply voltage Vcc of the microcomputer IC1.

As described above, the AD conversion unit 34 converts the detection voltage Vc detected by the abnormality detecting unit 14 into a digital value and outputs the digital value to the abnormality determining unit 33. When the detection voltage Vc, which has been converted into the digital value by the AD conversion unit 34, is equal to or less than a preset reference voltage (threshold value), the abnormality determining unit 33 determines an abnormality, such as a no-load state or the like.

When an abnormality, such as a no-load state or the like, is determined by the abnormality determining unit 33, the output control unit 32 controls the driving signal (gate signal) outputted to the switching element Q1 to be an off signal, thereby stopping the oscillation of the switching element Q1 and the operation of the step-down converter.

The lighting device 5 of the first embodiment enables the detection of a no-load state or the like by adding a resistance and a transistor. In this way, the lighting device 5 can detect an abnormality in the load with a simple configuration.

Although the output control unit 32 is configured with the microcomputer IC1 in the present embodiment, a PFC controller (product name: L6562A) may be used instead of the microcomputer IC1, which will be applied to the following embodiments in the same way.

Figure 3:
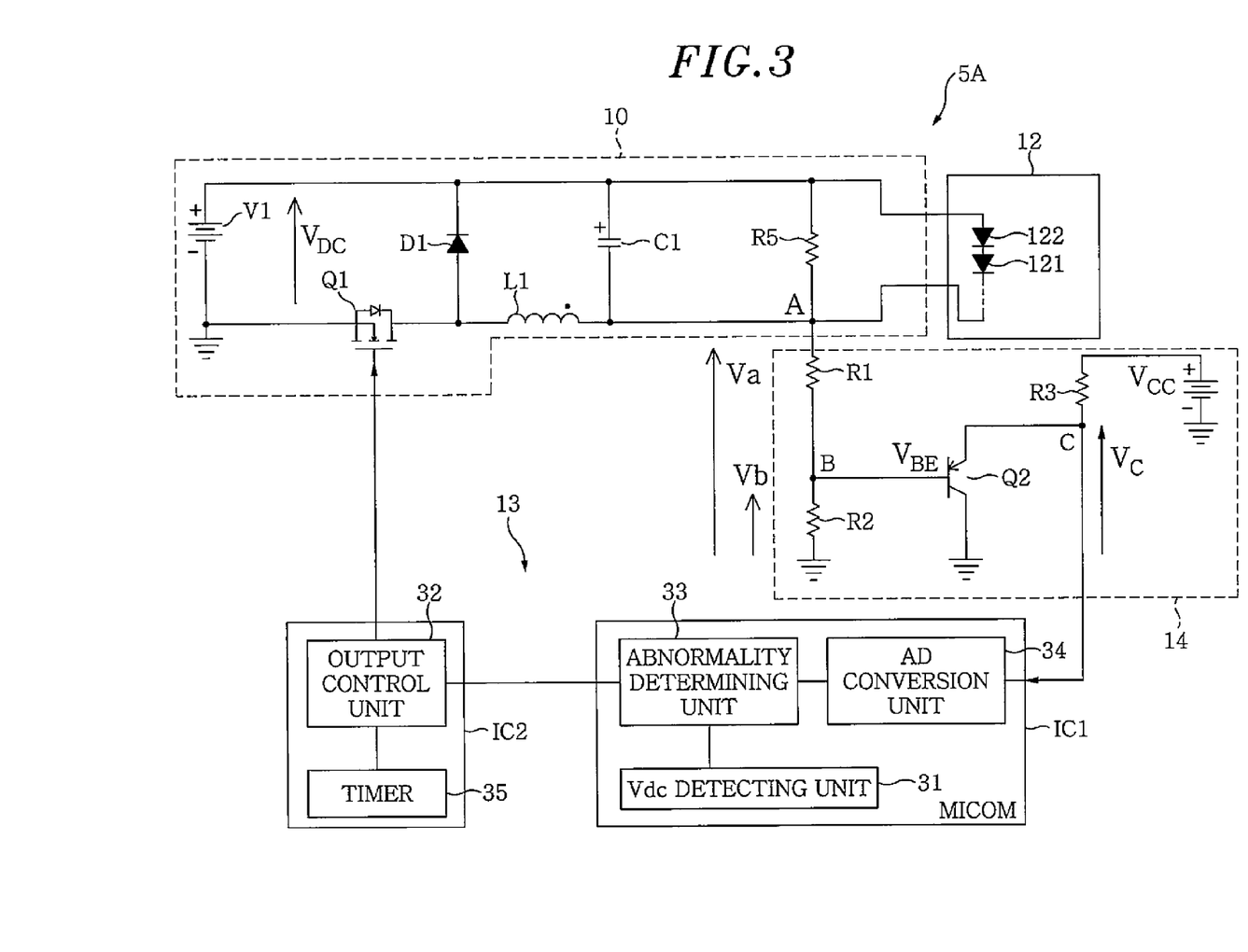
FIG. 3 is a circuit diagram illustrating a configuration of another lighting device in accordance with the first embodiment.

FIG. 3 is a circuit diagram illustrating a configuration of another lighting device 5A. In FIG. 2, like reference numerals refer to like elements and descriptions thereof will be omitted herein. The operations of the lighting device 5A are the same as those in FIG. 2.

A controller 13 in FIG. 3 corresponding to that in FIG. 1 (microcomputer IC1 of FIG. 2) is formed of a microcomputer IC1 and a PFC controller IC2. In FIG. 3, the microcomputer IC1 includes a Vdc detecting unit 31, an abnormality determining unit 33 and an AD conversion unit 34 as described above. Meanwhile, the PFC controller IC2 includes an output control unit 32 and a timer 35 as described above.

When an abnormality is detected, the output control unit 32 controls an ENABLE terminal to be a low level so that a driving signal is not outputted from the microcomputer IC1. Accordingly, the output control unit 32 can stop the oscillation of the switching element Q1.

Second Embodiment

While the first embodiment illustrates the LED module including a single LED unit having LEDs connected in series, a second embodiment illustrates LED units are provided in color light sources of red (R), green (G) and blue (B), respectively.

Figure 4:
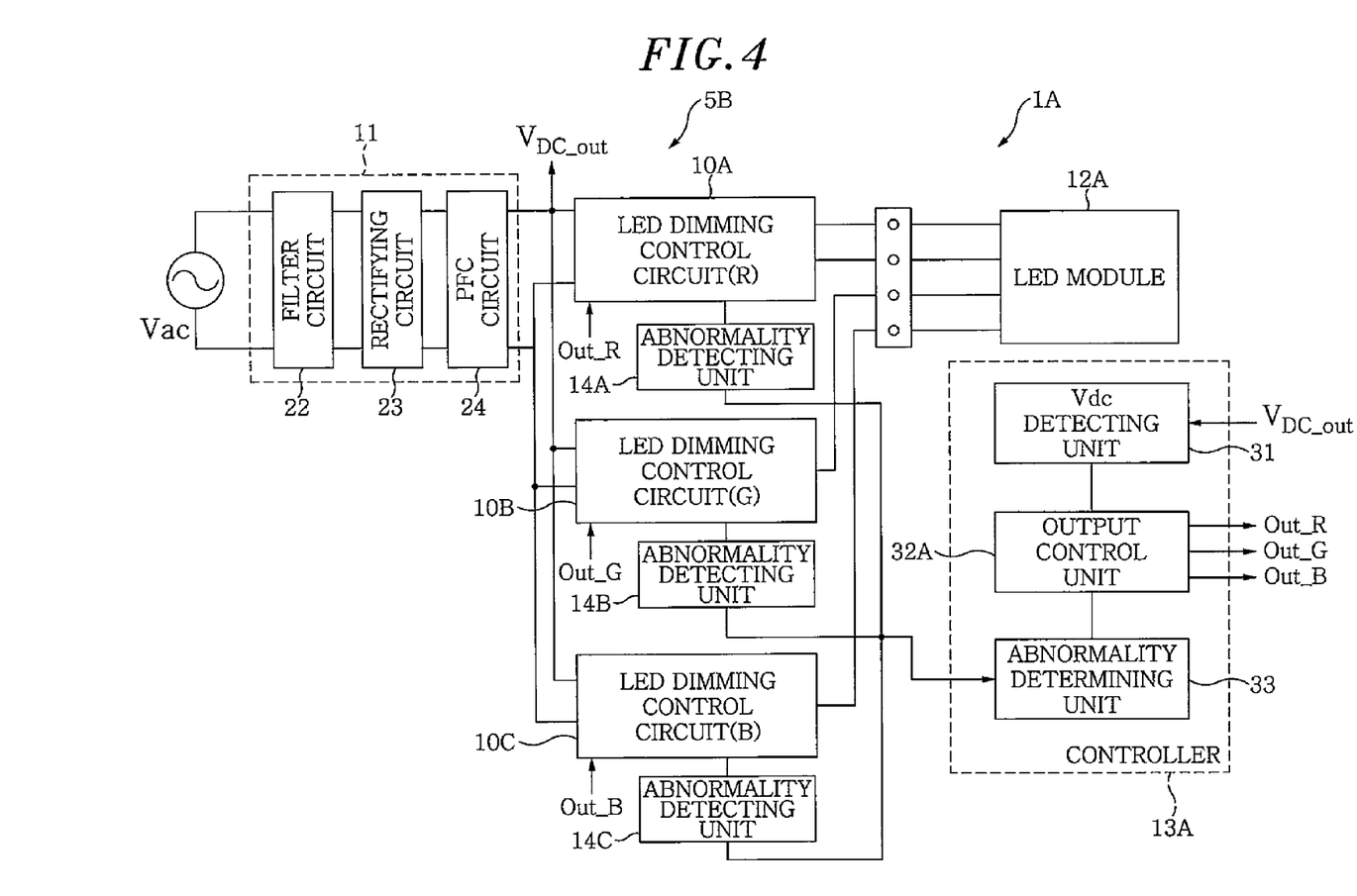
FIG. 4 is a block diagram illustrating a configuration of illumination apparatus in accordance with a second embodiment of the present invention.
Figure 5:
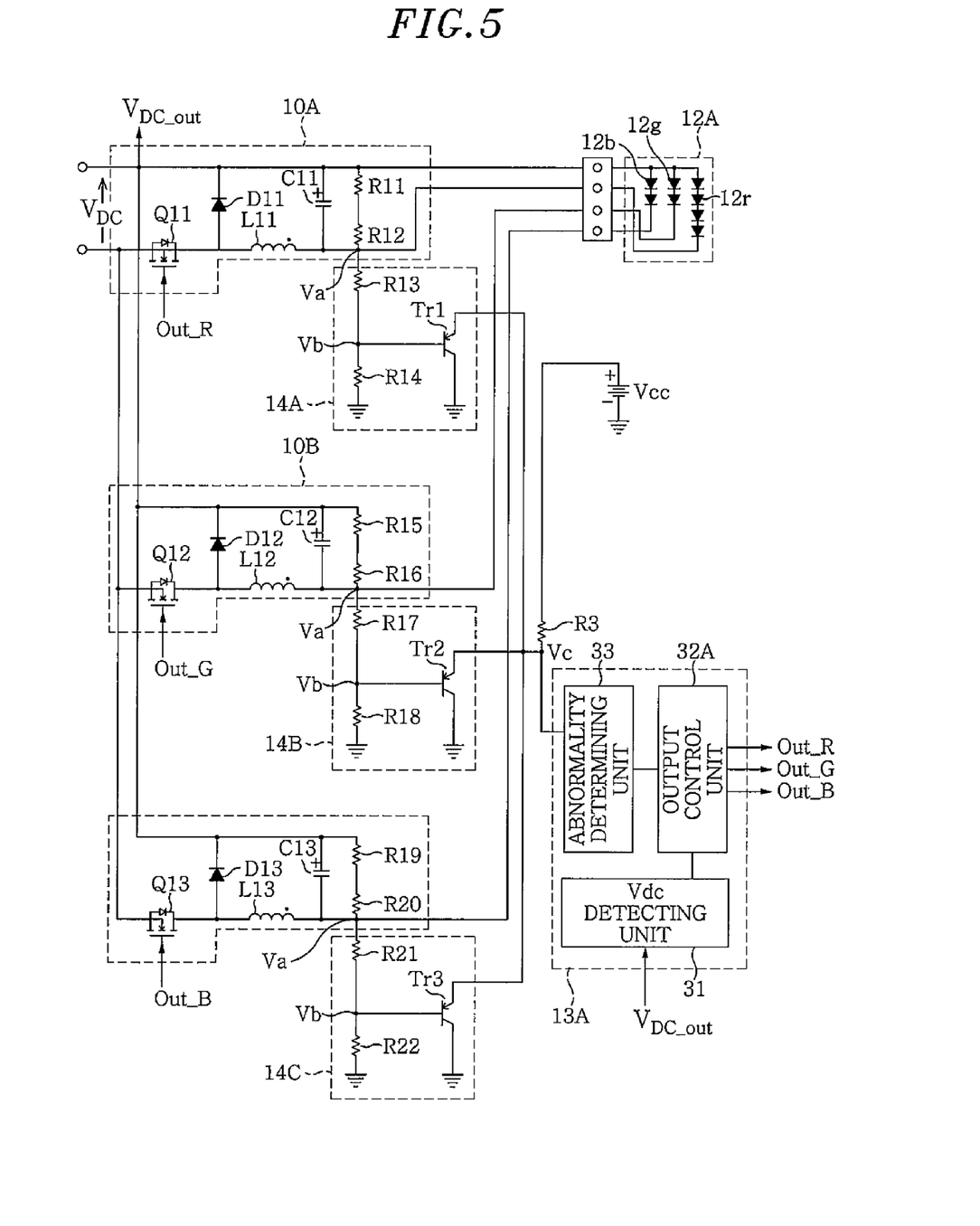
FIG. 5 is a circuit diagram illustrating a configuration of a lighting device in accordance with the second embodiment.

FIG. 4 is a block diagram illustrating a configuration of illumination apparatus 1A in accordance with the second embodiment. The illumination apparatus 1A includes an LED module 12A as a load and a lighting device 5B. FIG. 5 is a circuit diagram illustrating a configuration of the lighting device 5B.

The LED module 12A includes three LED units 12b, 12g and 12r each having LEDs connected in series as R, G and B color light sources.

In the present embodiment, the LED unit 12b includes, e.g., two blue (B) LEDs connected in series. The LED unit 12g includes, e.g., two green (G) LEDs connected in series. The LED unit 12r includes, e.g., four red (R) LEDs connected in series.

DC voltage $V_{DC}$ (e.g., 24 V) is supplied to a common anode of the three LED units 12b, 12g and 12r.

Further, the lighting device 5B includes three LED dimming control circuits 10A, 10B and 10C provided with respect to the individual color light sources. The three LED dimming control circuits 10A, 10B and 10C have an almost same configuration as the LED dimming control circuit 10 of the first embodiment.

Discharge resistances R11 and R12 connected in series in the LED dimming control circuit 10A are connected in parallel to the LED unit 12r. Likewise, discharge resistances R15 and R16 connected in series in the LED dimming control circuit 10B are connected in parallel to the LED unit 12g.

Further, discharge resistances R19 and R20 connected in series in the LED dimming control circuit 10C are connected in parallel to the LED unit 12b.

Also, the lighting device 5B includes at least three abnormality detecting units 14A, 14B and 14C. Each of the three abnormality detecting units 14A, 14B and 14C detect detection voltage Vc corresponding to voltage Va at a low-voltage side of the three LED units 12r, 12g and 12b. The three abnormality detecting units 14A, 14B and 14C have the almost same configuration as the abnormality detecting unit 14 in the first embodiment.

The emitters of transistors Tr1, Tr2 and Tr3 of the three abnormality detecting units 14A, 14B and 14C are connected together. Thus, when a voltage at both ends of the discharge resistance abnormally increases in at least one of the three LED dimming control circuits 10A, 10B and 10C and the voltage Va decreases, a corresponding transistor among the transistors Tr1, Tr2 or Tr3 is turned on and the detection voltage Vc at an emitter connection point decreases.

An abnormality determining unit 33 compares the detection voltage Vc at the emitter connection points of the transistors Tr1, Tr2 and Tr3 with reference voltage (threshold value), and determines that a no-load state or abnormal load voltage in the LED module 12A occurs when the detection voltage Vc is the threshold value or lower.

When the abnormality determining unit 33 determines that an abnormality occurs in the load, an output control unit 32A outputs off signals as driving signals Out_R, Out_G and Out_B to switching elements Q11, Q12 and Q13 in the LED dimming control circuit 10A, 10B and 10C, respectively. Accordingly, each step-down converter stops operating. Further, even though the step-down converter stops operating, the PFC circuit 24 still operates, thus securing power for a microcomputer configuring a controller 13A.

Figure 6:
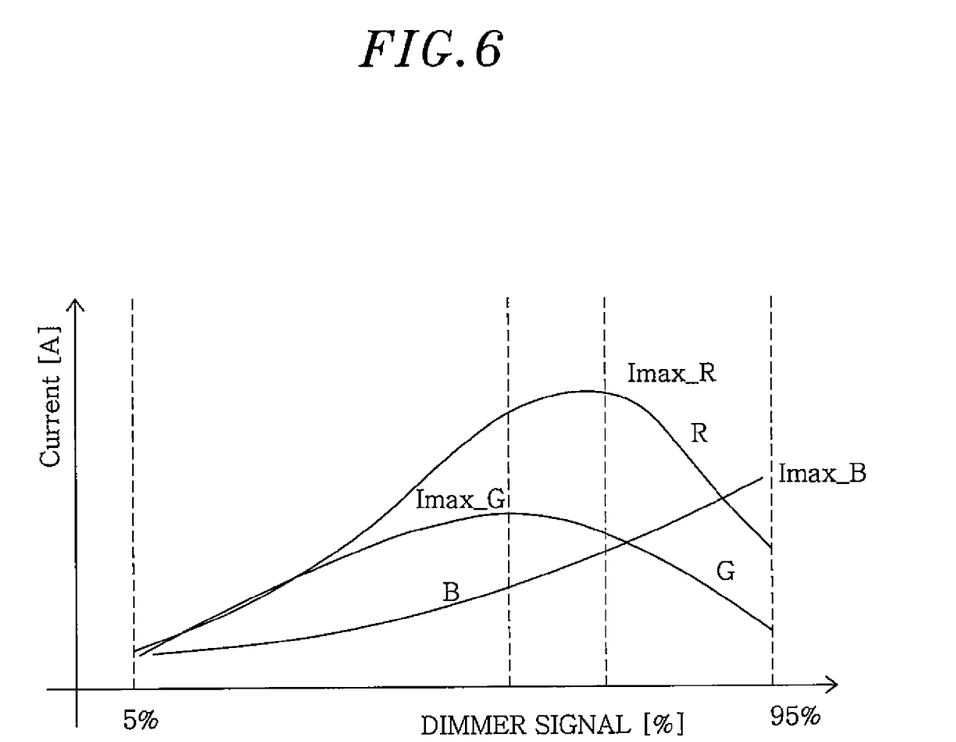
FIG. 6 is a graph illustrating dimming curves.

The voltages Va in the three LED dimming control circuits 10A, 10B and 10C vary depending on the dimming curve or forward voltage drop of each LED. FIG. 6 is a graph illustrating dimming curves.

The horizontal axis of FIG. 6 represents the dimming level of a dimmer signal. The vertical axis of FIG. 6 represents a level of current supplied to each LED. The green LED unit 12g exhibits a peak value of current at a lower dimming level than the red LED unit 12r. The blue LED unit 12b does not exhibit a peak value of current and the level of current supplied thereto increases as the dimming level becomes greater.

Since each LED unit has a different load voltage, it is necessary to adjust each voltage Va according to a voltage divider resistance in order to detect a no-load state which occurs at a specific dimming extent. When the voltages Va of the LED units 12b, 12g and 12r are defined as Vab, Vag and Var, respectively, the voltages Vab, Vag and Var at the cathodes of the LED units 12b, 12g and 12r are represented by Equation 5. Further, $V_{LEDb}$, $V_{LEDg}$ and $V_{LEDr}$ are load voltages of the LED units 12b, 12g and 12r, respectively.

$$V_{ar} = V_{DC} - V_{LEDr}$$

$$V_{ag} = V_{DC} - V_{LEDg}$$

$$V_{ab} = V_{DC} - V_{LEDb} \quad \text{[Equation 5]}$$

The detection voltages detected by the abnormality detecting units 14A, 14B and 14C, i.e., emitter voltages (detection voltages) Vcb, Vcg and Vcr of the transistors Tr1, Tr2 and Tr3 when assuming that the emitters thereof are not connected, are represented by Equation 6. In addition, $V_{BE}$ is a voltage between a base and an emitter of each of PNP transistors Tr1, Tr2 and Tr3.

$$V_{cr} = (V_{DC} - V_{LEDr}) \times \frac{R14}{R13 + R14} + V_{BE} \quad \text{[Equation 6]}$$

$$V_{cg} = (V_{DC} - V_{LEDg}) \times \frac{R18}{R17 + R18} + V_{BE}$$

$$V_{cb} = (V_{DC} - V_{LEDb}) \times \frac{R22}{R21 + R22} + V_{BE}$$

Further, as in the first embodiment, voltage at both ends of the discharge resistance< the forward voltage of the LED module is established, whereby the LEDs do not emit a light in a turnoff state. Forward voltage drop Vf at which the LED is completely turned off varies depending on the kind of the LED. When rated (forward) voltage is 3.0 V, the voltage V (R11+R12) at both ends of the discharge resistance is calculated by Equation 7 by using 1.5 V corresponding to about 50% of the rated forward voltage to further completely turn off the LED module 12A. In Equation 7, n is the number of LEDs as in Equation 4. Here, Equation 7 is related to the red light source but may be applied to the green and blue light sources.

$$V_{(R11+R12)} = V_{DC} \times \frac{R11 + R12}{\sum_{i=11}^{14} Ri} < 1.5 \times n \quad \text{[Equation 7]}$$

In accordance with the lighting device 5B of the second embodiment, even though LED units forming respective color light sources are connected in parallel, divided voltage ratios can be changed by using resistances and transistors and the detection voltages of abnormality detecting unit 14A to 14C can be made identical to each other. That is, the lighting device 5B can securely detect an abnormality even when different types of LED circuits are connected in parallel. Thus, even though the forward voltage drops Vf are considerably different, the detection voltage Vc can be adapted for the input range (0 to 5V) of the microcomputer.

Moreover, although the present embodiment illustrate the emitters of the transistors Tr1, Tr2 and Tr3 in the abnormality detecting units 14A, 14B and 14C are connected with each other and the abnormality determining unit 33 compares the detection voltage Vc at the emitter connection point with the threshold value, the following process is also possible. That is, the emitters of the transistors Tr1, Tr2 and Tr3 may not be connected together to enable the emitter voltages of the transistors Tr1, Tr2 and Tr3 to be inputted to the abnormality determining unit 33, separately, and the abnormality determining unit 33 may determine whether or not abnormal load voltage occurs in each LED unit. Accordingly, the abnormality determining unit 33 can specify an LED unit in which an abnormality occurs.

Third Embodiment

In the third embodiment, a lighting device stops the operation of an abnormality detecting unit in synchronization with a burst operation when performing the dimming control on an LED module by using a burst dimming operation.

Figure 7:
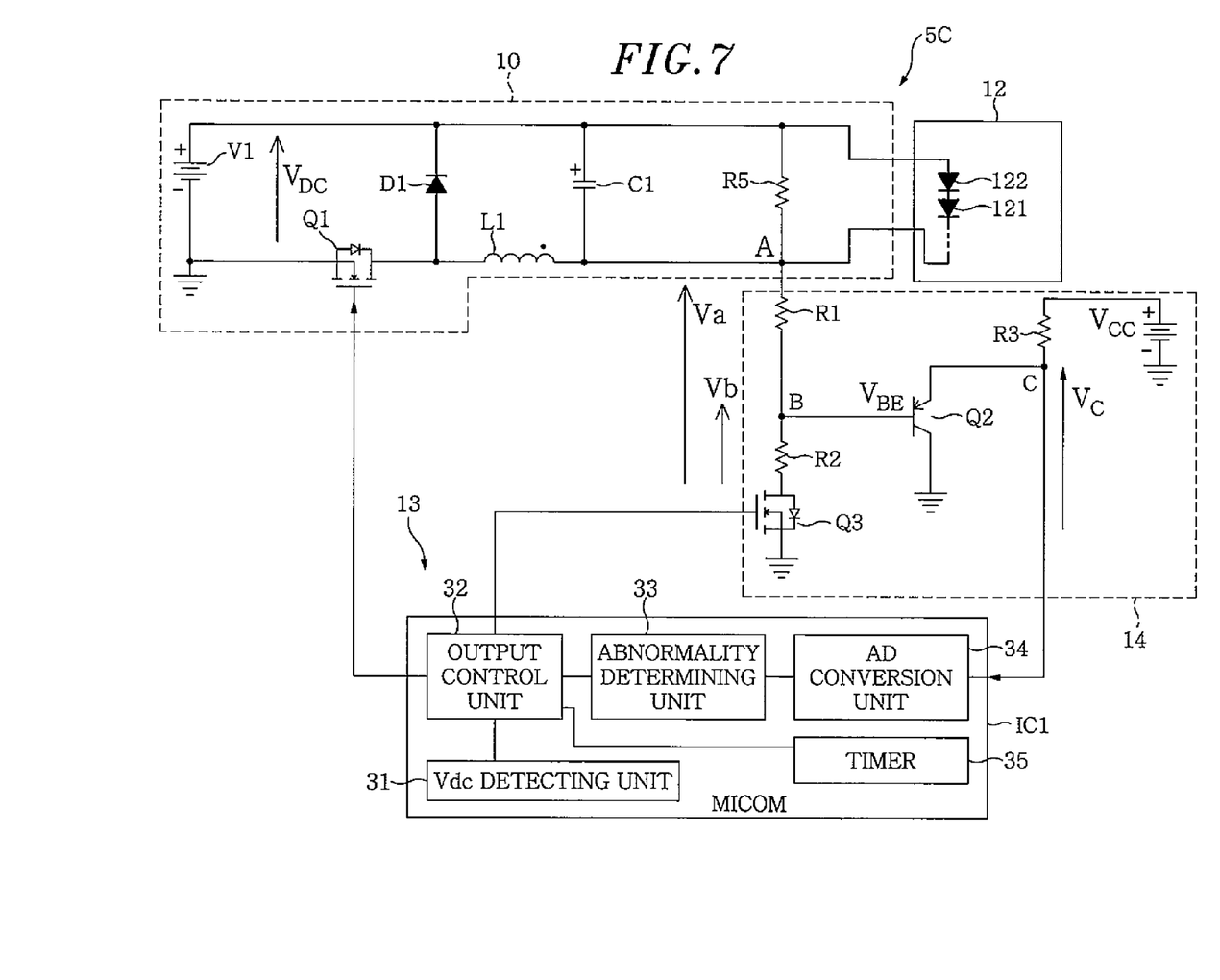
FIG. 7 is a circuit diagram illustrating a configuration of a lighting device in accordance with a third embodiment of the present invention.

FIG. 7 is a circuit diagram illustrating a configuration of a lighting device 5C in accordance with the third embodiment. The lighting device 5C of the third embodiment has the almost same configuration as the lighting device 5 of the first embodiment, and thus like reference numerals refer to like elements and descriptions thereof will be omitted herein.

As a second switching unit, a switching element Q3 configured with an FET is connected between one terminal of a resistance R2 and a ground GND. A signal from an output control unit 32 in a microcomputer IC1 is inputted to the gate terminal of the switching element Q3.

While a step-down converter is stopped by outputting an off signal to the switching element Q1 in a burst operation, the output control unit 32 outputs the same off signal to the switching element Q3 to turn off the switching element Q3. Accordingly, a PNP transistor Q2 is turned off and an operation of a abnormality detecting unit 14 is stopped.

Meanwhile, while the step-down converter is operated by outputting an on signal as a driving signal to the switching element Q1 in the burst operation, the output control unit 32 outputs an on signal to the switching element Q3 to turn on the switching element Q3. Accordingly, the abnormality detecting unit 14 operates.

In this manner, the output control unit 32 stops the operation of the abnormality detecting unit 14 for a non-dimming control period in the burst operation, thereby reducing a power loss by the abnormality detecting unit 14.

Further, even in a dimming control off state in which the dimming control onto the LED module 12 is not conducted, the output control unit 32 also outputs an off signal to the switching element Q3 to turn off the switching element Q3, thereby stopping the operation of the abnormality detecting unit 14. Accordingly, the output control unit 32 can reduce a power loss by the abnormality detecting unit 14.

As described above, the lighting device 5C in accordance with the third embodiment can improve the efficiency of a power factor. Further, the lighting device 5C turns off the switching element Q3 during light out status without the discharge resistance R5, thereby preventing the LED module 12 from emitting a light.

Fourth Embodiment

Figure 8:
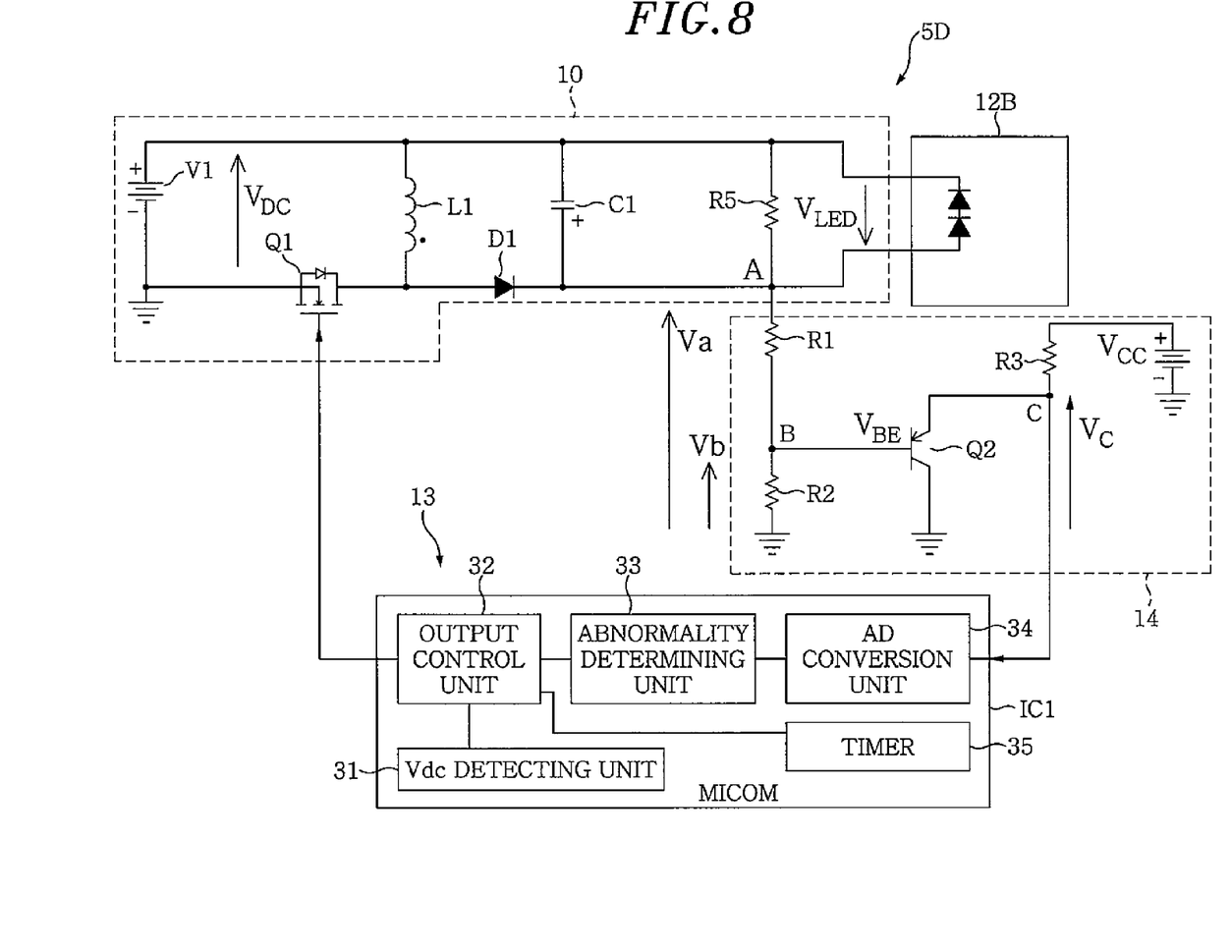
FIG. 8 is a circuit diagram illustrating a configuration of a lighting device in accordance with a fourth embodiment of the present invention.

In the fourth embodiment, an LED dimming control circuit operates as a step-up/down converter (buck-boost circuit). FIG. 8 is a circuit diagram illustrating a configuration of a lighting device 5D in accordance with the fourth embodiment. As the lighting device 5D of the fourth embodiment has the almost same configuration as the lighting device 5 of the first embodiment, like reference numerals refer to like elements.

Comparing with the lighting device 5, the lighting device 5D has a choke coil L1 for a chopper and a regenerative diode D1 in different positions. Further, the anode of the LED module 12B is connected to a connection point A. Thus, voltage Va at the connection point A has higher potential than DC voltage $V_{DC}$.

As in the first embodiment, voltage Vb divided from the voltage Va by resistances R1 and R2, is inputted to a base of a PNP transistor Q2. As the PNP transistor Q2 performs an emitter-follower operation, an emitter voltage (detection voltage) Vc is changed and inputted to a microcomputer IC1.

When the load voltage $V_{LED}$ of the LED module 12B is equal to or greater than a predetermined value due to a no-load state or abnormal voltage increase, the emitter voltage (detection voltage) Vc becomes equal to or less than a threshold value set by the microcomputer IC1. The voltages Va, Vb and Vc are represented by Equations 1, 2 and 3, respectively.

When the microcomputer IC1 detects that the detection voltage Vc is equal to or less than the threshold value, a controller 13 stops a driving signal outputted to a switching element Q1 so as to stop oscillating the step-up/down converter. In detail, when an abnormality is detected, an output control unit 32 stops the operation of the step-up/down converter by adjusting the driving signal (gate signal) of the switching element (FET) Q1 to be an off signal by the microcomputer IC1. However, after stopping, the output control unit 32 may resume the oscillation after a set time of a timer 35 embedded in the microcomputer IC1. Further, the output control unit 32 may completely stop the operation of the step-up/down converter only when a process of resuming→ detecting an abnormality→ stopping is repeated a plurality of times.

Here, unlike in the first embodiment, the buck-boost circuit does not involve a current path through which a current slightly flows into an LED to cause light emission during the light out status. However, when there is no discharge resistance R5, the voltage $V_{DC}$ is applied to the LED module 12, i.e., a load, as reverse voltage when the oscillation stops. In order to prevent the reverse voltage from exceeding the withstand voltage of the LED module 12B, the reverse voltage is divided by the discharge resistance R5, and the resistances R1 and R2 in an abnormality detecting unit 14, thereby suppressing the reverse voltage applied to the LED module 12B.

The lighting device 5D in accordance with the fourth embodiment can supply higher voltage than the DC voltage $V_{DC}$ to the LED module and have a wider scope of application.

Although the foregoing embodiments have been shown and described with reference to the drawings, the present invention is not limited to the embodiments. It will be understood by those skilled in the art that various changes and modification may be made without departing from the scope of the invention as defined in the following claims.

For example, the second embodiment illustrates a parallel circuit in which different types of LED units, each having a different number of elements, are connected in parallel. However, LED circuits having different kinds of LEDs, different levels of forward voltage drop Vf, different numbers of elements and different dimming curves may be connected in parallel.

Further, while an LED is used as a light emitting unit in the embodiments described above, different types of light emitting units may be employed.

In addition, a diode can be used instead of a PNP transistor Q2. In this case, the cathode is connected to the connection point B, and the anode is connected to the connection point C. When voltage Vb at the connection point B decreases, the diode conducts electricity. As detection voltage Vc at the connection point C decreases, an abnormality in the load can be detected.

While the invention has been shown and described with respect to the embodiments, it will be understood by those skilled in the art that various changes and modification may be made without departing from the scope of the invention as defined in the following claims.

What is claimed is:
1. A lighting device comprising:
a direct current (DC) converter including at least an inductor, a switching unit and a diode and being configured to output an energy accumulated in the inductor to a load via the diode by using an input from a DC power source when the switching unit is turned off;
a load voltage detection unit connected to the load to detect a load voltage of the load;
an abnormality determining unit configured to determine an abnormality when the load voltage is equal to or less than a preset threshold voltage; and an output control unit configured to drive the switching unit so that oscillation of the switching unit is stopped or the output of the DC converter is decreased when the abnormality is determined, wherein the DC converter includes a discharge resistor connected in parallel with the load, the load is a module including light emitting elements connected in series, and a resistance of the discharge resistor is set such that the load voltage is less than a value obtained by multiplying 70% of rated forward voltage of the light emitting elements by a number of the light emitting elements.

2. The lighting device of claim 1, wherein the DC converter is a step-down converter, one terminal of the load is connected to a high-potential side of the DC power source, one terminal of the inductor is connected to another terminal of the load, the switching unit is connected between the other terminal of the inductor and a low-potential side of the DC power source, an anode of the diode is connected between the inductor and the switching unit, and a cathode of the diode is connected to the high-potential side of the DC power source.

3. The lighting device of claim 1, wherein the DC converter is a step-up/down converter, and one terminal of the load is connected to a high-potential side of the DC power source, wherein the diode and the switching unit are connected between another terminal of the load and a lower-potential side of the DC power source such that an anode of the diode is connected to the switching unit and a cathode of the diode is connected to another terminal of the load, and wherein the inductor is connected between the high-potential side of the DC power source and a node connecting the diode and the switching unit.

4. The lighting device of claim 2, wherein the load voltage detection unit includes resistances connected in series between the another terminal of the load and a predetermined potential to divide voltage at a connection point with the another terminal.

5. The lighting device of claim 3, wherein the load voltage detection unit includes resistances connected in series between the another terminal of the load and a predetermined potential to divide voltage at a connection point with the another terminal.

6. The lighting device of claim 1, further comprising a DC voltage detection unit detecting a DC voltage of the DC power source, wherein the output control unit ignores abnormality determination by the abnormality determining unit when the DC voltage detected by the DC voltage detection unit is out of a normal range.

7. The lighting device of claim 1, wherein the load is configured with a module including light emitting element units connected in parallel, each of light emitting element units having light emitting elements connected in series, the light emitting element units are provided with DC converters and load voltage detection units, respectively, and the abnormality determining unit determines an abnormality when at least one of load voltages detected by the load voltage detection units is equal to or less than a preset threshold voltage.

8. The lighting device of claim 1, wherein the output control unit is provided with a timer, drives the switching unit to stop the oscillation of the switching unit or to decrease the output of the DC converter when the abnormality is determined, and then resumes the oscillation of the switching unit after a time set in the timer.

9. The lighting device of claim 1, wherein the load voltage detection unit is connected to the load via another switching unit, and the output control unit turns off the another switching unit when driving the switching unit to stop the oscillation of the switching unit or to decrease the output of the DC converter.

10. An illumination apparatus comprising the lighting device of claim 1 and the load.

11. The lighting device of claim 4, wherein the predetermined potential is a ground potential.

12. The lighting device of claim 5, wherein the predetermined potential is a ground.

13. The lighting device of claim 1, wherein the discharge resistor is connected to terminals of the load, and the load voltage detection unit is connected to one of the terminals of the load for detecting the load voltage.

* * * * *